DUMMY LEAD INSERTER FOR WAFER STEMS

Filed June 30, 1955

INVENTOR
DONALD B. WATKINS
BY
Michael Hertz,
ATTORNEY

United States Patent Office 2,781,613

Patented Feb. 19, 1957

2,781,613

DUMMY LEAD INSERTER FOR WAFER STEMS

Donald B. Watkins, Emporium, Pa., assignor to Sylvania Electric Products Inc., a corporation of Massachusetts Application June 30, 1955, Serial No. 519,096

2 Claims. (Cl. 49—76)

In the manufacture of electron tubes using glass wafer stem construction all leads external of the tube are utilized for making electrical connections with elements within the tube. Prior to this invention, when a support within the tube is imperative, the conventional lead is used and the external portion is cut off as close to the glass header as possible. In this case it is desirable to use a special tube base or socket to prevent contact with the cut off lead. Cutting off leads is an operation increasing manufacturing costs and sometimes causes cracks in the glass.

It is an object of the invention to provide a means for inserting into the soft glass, during fabrication of the wafer stem, one or more short dummy leads.

It is a further object of the invention to so insert a dummy lead that it will not pass through what will be the outer surface of the stem, thereby to prevent possibility of accidental electrical connections with internal elements of the tube or of tube leakage between supported part and an electrode due to moisture or the like on the exterior stem portion of the completed tube.

It is a still further object of the invention to insert a lead or leads into the stem during the final pressing or molding operation on the stem so that all desired glass strains in the stem about the stem leads will be attained simultaneously.

These and other objects will be appreciated after reading the following specification and claims when taken in conjunction with the accompanying drawing in which:

The press jaw disclosed herein is intended to replace the conventional upper press jaw utilized in making wafer stems of the type wherein all leads extend through the stem on both sides of the stem.

In the art, in the manufacture of wafer stems of the type here illustrated, it is customary to employ a machine having a horizontal rotatable turret on which are circumferentially arranged a large number of vertical spindles set into rotation during manufacture of the glass stems. Each of these spindles carries a mold portion provided with vertical recesses arranged circularly about the axis of the spindle into which are fed the stem leads to be fused into the glass to form the wafer stem. About the leads is placed a collar of glass. The turret is rotated step by step and at several stations jets of hot flames play on the glass and leads carried by the spindles while the spindles rotate. Thus the parts are heated so that eventually the glass collar fuses and flows into and about the spaces between the stem leads.

At a subsequent station, while the glass is fused, a top press mold or jaw presses the glass into approximate wafer form and about the stem leads, the stem leads above the upper surface of the glass being received within a hollow portion of the upper mold. The wafer stem with its embedded leads is now further heated while rotated and at a subsequent station a second and final press occurs, to bring the wafer stem to its final form.

Figures 1, 2, 3:
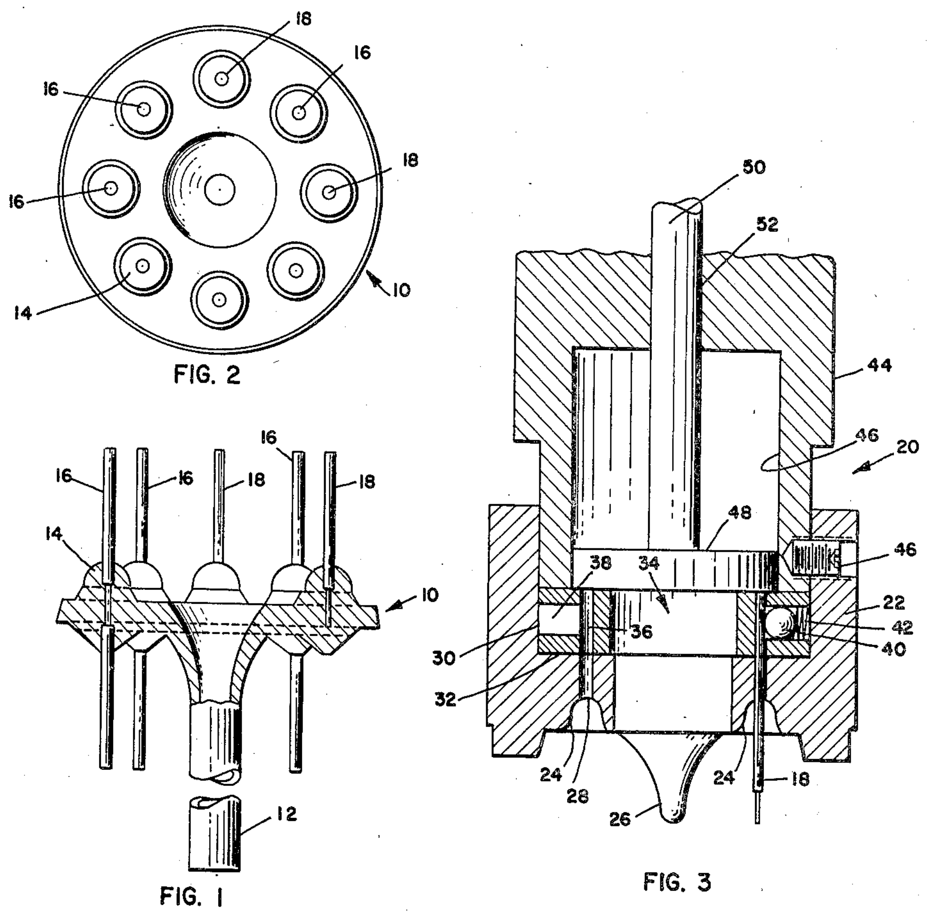
Fig. 1 is a view, partly in vertical section, of a wafer stem with exhaust tubulation attached thereto and showing a dummy pin lead as well as ordinary through stem leads embedded in the wafer stem.
Fig. 2 is a top plan view of the wafer stem of Fig. 1.
Fig. 3 is a vertical cross section through a press jaw embodying the invention and Fig. 4 is a plan view of a dummy lead holder utilized within the jaw of Fig. 3.
Figure 4:
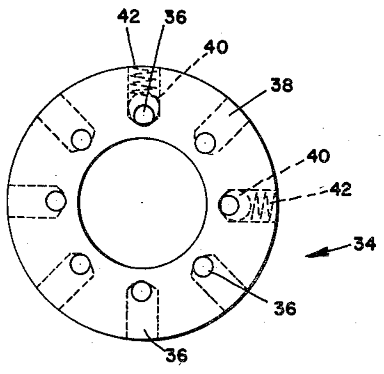

It is to the structure of the upper mold at this second press station that the invention is directed. For an understanding of the construction and operation of the upper mold, attention is first directed to the stem of Figs. 1 and 2.

In these figures there is illustrated a pressed glass wafer 10 with attached glass tubulation 12, although insofar as this invention is concerned, the wafer may be of the non-tubulated type and wherein the tubulation is on the bulb, later sealed onto the wafer. The wafer is molded with protuberances 14, these embedding the normally employed stem leads 16. The portions of the stem leads extending below the wafer serve as external electrical connecting means for the completed electron tube while the portions of the stem leads extending above the wafer serve as electrical connecting and supporting means for the elements within the tube. The short stem leads, indicated at 18, do not extend below the glass and serve merely as tie elements for electrodes within the tube or as support elements therein.

As stated heretofore, it had been conventional to manufacture the stem by supporting all of the stem leads, both conducting leads and support leads, within a lower mold section, all leads, in the finished wafer, extending below the glass, with the undesirable results already set forth. In accordance with this invention, short leads 18 are supported, initially, in the final upper press mold. Such a lead supporting mold is illustrated at 20 in Fig. 3. This mold comprises a jaw 22, the lower surface of which is provided with recesses 24 to form the protuberances 14 on the wafer and with a center projection 26 to form the funnel shaped opening in the wafer leading to the tubulation. The upper jaw of this invention is also provided with bores 28. These bores serve to maintain pins 16 and 18 in vertical positions as they are molded into the wafer. The jaw is further provided with a recess 30 having a flat bottom 32 on which is seated a torus 34 having a number of vertical bores 36 equal in number to the number of bores 28 in the jaw 22 and registering therewith. Communicating with each of the vertical bores is a radial bore 38, this bore leading to the outer circumference of the torus. In each radial bore which communicates with a vertical bore in which no stem lead 16 is to extend there is provided a ball 40, spring loaded by a light spring 42, so as to lightly engage a short support stem 18 thrust into the bore 36 by any desired means or manually.

The jaw is made fast to the upper spindle 44, which rests on the torus 34. This spindle rotates with the lower spindle during press action. Securement of spindle 44 to jaw 22 is effected by the use of one or more Allen-head set screws 46. The upper spindle is hollowed to provide a circular bore 46 within which is loosely fitted a cylindrical weight or block 48 fast with a guide stem 50 passing freely through a bore 52 in the spindle 44. As pins 18 are inserted into the upper jaw, the block 48 will yield allowing free insertion of the pins but bringing them all down to an even level on removal of upward thrust on the pins. Also the weight will maintain the pins at proper level with respect to one another, as the spindle descends onto the molten partly formed wafer during the final press operation.

After the final press operation, the upper spindle and jaw are raised and the pins 18 will strip from the jaw.

It has been found in practice that the glass of the stem has been cooled sufficiently by the press jaw, during the pressing operation, to enable it to retain the stems 18, notwithstanding the light spring action on the ball detents, resulting in a stem provided with both through and dummy pins.

Having thus described the invention, what is claimed is:

1. An upper press jaw for forming electron tube wafer stems and the like comprising a jaw with downwardly directed stem forming elements and a central recess in the upper portion thereof, a spindle rigidly connected with the jaw having a hollow portion communicating with the recess in the jaw, a vertical bore through the jaw and communicating with the recess, resiliently urged means engaging a lead inserted into the bore, and a block in the hollow portion of the spindle freely movable vertically therein to press on the upper end of the inserted lead.

2. An upper press jaw for forming electron tube wafer stems and the like comprising a jaw with downwardly directed stem forming elements and a recess in the upper portion thereof, a torus with radial bores held in the recess, vertical bores extending completely through the jaw and torus, balls in the radial bores spring urged into the vertical bores, a hollow spindle rigidly secured to the jaw with the hollow portion registering with the recess in the jaw, and a block freely movable in the hollow of the spindle and overlying the vertical bores in the jaw and torus.

References Cited in the file of this patent

UNITED STATES PATENTS

| | | |
|---|---|---|
| 2,321,600 | Horn | June 15, 1943 |
| 2,482,119 | Mickley | Sept. 20, 1949 |
| 2,497,545 | Greiner | Feb. 14, 1950 |
| 2,509,531 | Ruhland | May 30, 1950 |